(12) United States Patent
Pero

(10) Patent No.: US 9,198,411 B2
(45) Date of Patent: Dec. 1, 2015

(54) ALLIGATOR GAME CALL DEVICE

(71) Applicant: Charles Pero, Lake Worth, FL (US)

(72) Inventor: Charles Pero, Lake Worth, FL (US)

(*) Notice: Subject to any disclaimer, the term of this patent is extended or adjusted under 35 U.S.C. 154(b) by 3 days.

(21) Appl. No.: 14/269,925

(22) Filed: May 5, 2014

(65) Prior Publication Data

US 2015/0313205 A1    Nov. 5, 2015

(51) Int. Cl.
*A63H 33/40* (2006.01)
*A01M 31/00* (2006.01)

(52) U.S. Cl.
CPC .................................. *A01M 31/004* (2013.01)

(58) Field of Classification Search
CPC .................................................. A01M 31/004
USPC .................. 446/202, 207, 209, 210, 211, 213
See application file for complete search history.

(56) References Cited

U.S. PATENT DOCUMENTS

| | | | | |
|---|---|---|---|---|
| 728,083 A * | 5/1903 | Childers | ...................... | 446/209 |
| 853,148 A * | 5/1907 | Alter | ............................ | 446/209 |
| 949,021 A * | 2/1910 | Lenherr | ......................... | 84/399 |
| 2,118,609 A * | 5/1938 | Klug | ............................ | 446/179 |
| 2,606,400 A * | 8/1952 | Olt et al. | ...................... | 446/207 |
| 2,651,141 A * | 9/1953 | Bicocchi | ...................... | 446/208 |
| 2,711,614 A * | 6/1955 | Halsten | ......................... | 446/208 |
| 3,466,794 A * | 9/1969 | McBroom et al. | ............ | 446/206 |
| 3,802,120 A * | 4/1974 | Erhart | ............................. | 446/77 |
| 3,815,283 A * | 6/1974 | Piper | ............................ | 446/202 |
| 4,207,703 A * | 6/1980 | Saso | ............................ | 446/205 |
| 4,612,001 A * | 9/1986 | Burnham | ...................... | 446/208 |
| 4,642,065 A * | 2/1987 | Whedon et al. | ............... | 446/209 |
| 4,737,130 A | 4/1988 | Mann | | |
| 4,915,660 A * | 4/1990 | Overholt, Sr. | ................. | 446/207 |
| 4,940,451 A * | 7/1990 | Leady | ........................... | 446/208 |
| 5,122,088 A * | 6/1992 | Meline | ......................... | 446/202 |
| 5,160,087 A * | 11/1992 | Mandell | .......................... | 239/33 |
| 5,230,649 A * | 7/1993 | Robertson | ..................... | 446/204 |
| 5,234,368 A * | 8/1993 | Carraway | ...................... | 446/202 |
| 5,803,785 A * | 9/1998 | Primos et al. | ................. | 446/207 |
| 5,885,126 A * | 3/1999 | Carlson | ......................... | 446/208 |
| 5,910,039 A * | 6/1999 | Primos et al. | ................. | 446/207 |
| 5,941,751 A * | 8/1999 | Johnson et al. | ............... | 446/213 |
| 6,095,884 A * | 8/2000 | Wiley | ........................... | 446/208 |
| 6,120,341 A * | 9/2000 | Hafford | ........................ | 446/208 |
| 6,231,417 B1 * | 5/2001 | Palmer | ......................... | 446/207 |
| 6,234,860 B1 * | 5/2001 | Cook | ............................ | 446/208 |
| 6,413,139 B1 * | 7/2002 | Douglas | ........................ | 446/204 |
| 6,435,933 B1 * | 8/2002 | Browne | ........................ | 446/207 |

(Continued)

OTHER PUBLICATIONS

International Search Report and Written Opinion, dated Jul. 13, 2015, from corresponding, co-owned International Patent Application No. PCT/US2015/025999.

*Primary Examiner* — Melba Bumgarner
*Assistant Examiner* — Joseph B Baldori
(74) *Attorney, Agent, or Firm* — Greenberg Traurig, LLP

(57) ABSTRACT

An alligator game call device is essentially a solid cylindrical body preferably having about a 5/4 inch outer diameter. The device has an exterior surface and a central axial blind bore therein extending from a proximal end to a distal end. The bore has stepped, concentric, progressively smaller diameter sections from the proximal end toward the distal end of the body. Preferably a first section is ½ inch deep, a second section is ½ inch deep, a third section is 1 inch deep and a fourth section is 1½ inch deep. The game call includes a pair of angled nostril bores extending from the fourth section to an exterior surface of the body, wherein the nostril bores intersecting the exterior surface are spaced ½ inch apart.

20 Claims, 3 Drawing Sheets

(56) References Cited

U.S. PATENT DOCUMENTS

| | | | |
|---|---|---|---|
| 6,527,614 B1* | 3/2003 | Primos | 446/207 |
| 6,575,804 B1* | 6/2003 | Primos | 446/202 |
| 6,669,529 B1* | 12/2003 | Scaries | 446/397 |
| 6,783,422 B1* | 8/2004 | Bean | 446/202 |
| 6,926,578 B1* | 8/2005 | Casias et al. | 446/202 |
| 7,070,473 B1* | 7/2006 | Cassette | 446/207 |
| 7,145,067 B2* | 12/2006 | Pfortmiller et al. | 84/380 R |
| 7,465,213 B1* | 12/2008 | Pribbanow | 446/202 |
| 7,658,660 B1* | 2/2010 | Drury | 446/206 |
| 7,997,951 B2* | 8/2011 | Rooney | 446/214 |
| 8,398,452 B2* | 3/2013 | Coin | 446/207 |
| 8,469,765 B2* | 6/2013 | Nolz et al. | 446/202 |
| D718,969 S * | 12/2014 | Hylton | D7/300.2 |
| 2007/0026760 A1* | 2/2007 | Stong, II | 446/204 |
| 2007/0037471 A1 | 2/2007 | Pepin | |
| 2007/0128971 A1* | 6/2007 | Langenfeld | 446/202 |
| 2007/0155278 A1* | 7/2007 | Burnett et al. | 446/209 |
| 2008/0009222 A1* | 1/2008 | Lombardi | 446/207 |
| 2009/0191786 A1* | 7/2009 | Pribbanow | 446/207 |
| 2012/0028536 A1* | 2/2012 | Jacobsen | 446/207 |
| 2013/0017755 A1* | 1/2013 | Hooks | 446/207 |

* cited by examiner

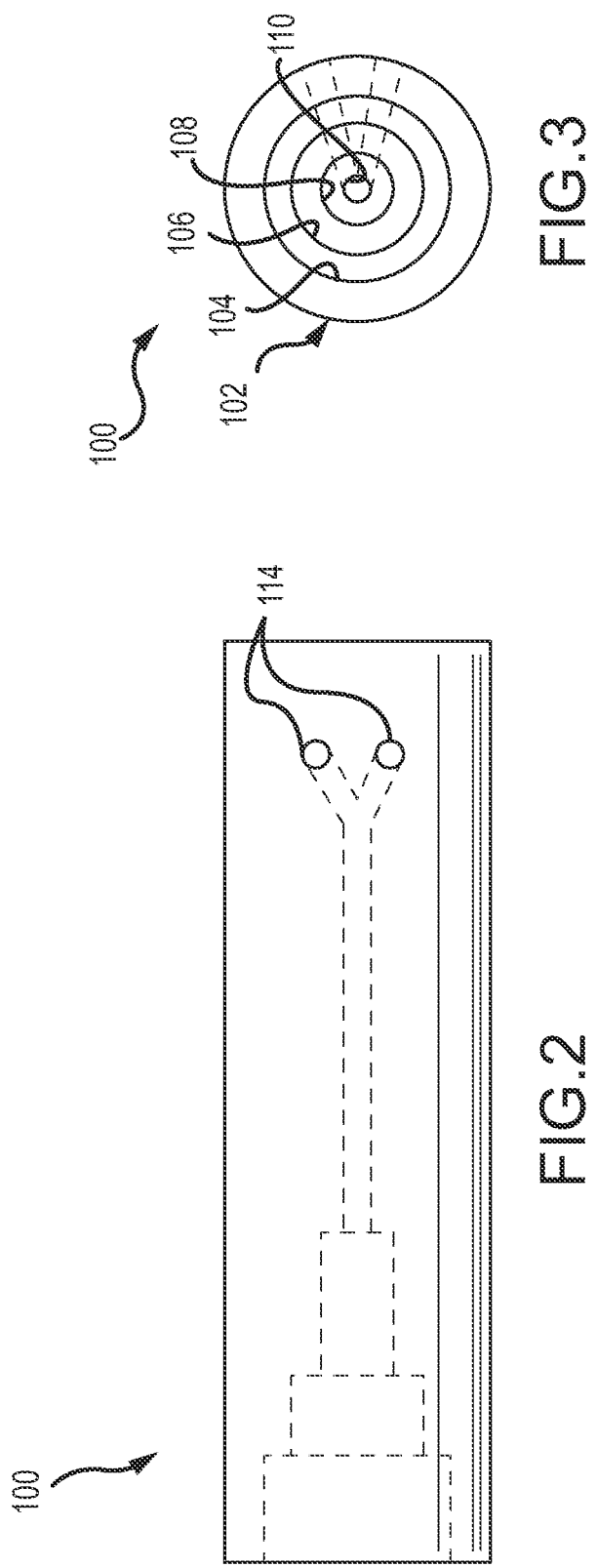

ALLIGATOR GAME CALL DEVICE

BACKGROUND

The present disclosure generally relates to wild animal game calls and more particularly to a game call mimicking a distressed baby alligator.

Numerous game calls have been developed over the years. Most involve use of a diaphragm or a set of reeds that vibrate as air is passed over or by them to generate a sound that is then shaped to sound like a mating call from the target animal. None have been specifically targeted to drawing out an alligator by mimicking a distress call from a baby alligator. Baby alligators do not call their mothers by opening their mouths and issuing a cry that the mother can hear. Instead, the baby alligator merely grunts through its nostrils. The sound produced by the young alligator is therefore muted and somewhat indistinct. The game call in accordance with the present disclosure imitates the baby alligator cry

SUMMARY

An exemplary embodiment of the game call in accordance with this present disclosure replicates generally the air passageways in the head of a baby alligator. A preferred embodiment of the game call device is essentially a solid cylindrical body having about a 5/4 inch outer diameter. The device has an exterior surface and a central axial blind bore therein extending from a proximal end to a distal end. The bore has stepped, concentric, progressively smaller diameter sections from the proximal end toward the distal end of the body. Preferably a first section is ½ inch deep, a second section is ½ inch deep, a third section is 1 inch deep and a fourth section is 1½ inch deep. The game call includes a pair of angled nostril bores extending from the fourth section to an exterior surface of the body, wherein the nostril bores intersecting the exterior surface are spaced ½ inch apart.

Preferably the first section has a diameter of about 1 inch. The second section preferably has a diameter of about ¾ inch. The third section has a diameter of about ½ inch. The fourth section preferably has a diameter of about ¼ inch and the nostril bores are radially angled about 45 degrees from the central axis of the cylindrical body and the nostril bores intersect the exterior surface ½ inch from the distal end of the body.

Another embodiment of the game call device may include a solid cylindrical body having an exterior surface and an outer diameter of about 1¼ inch. The body preferably has a central axial blind bore therein extending at least about 3½ inches axially from a proximal end toward a distal end of the body. This bore has stepped, concentric, progressively smaller diameter sections from the proximal end toward the distal end of the body. A first section has a diameter of about 1 inch. A second section has a diameter of about ¾ inch. A third section has a diameter of about ½ inch and a fourth section is 1½ inch deep and has a diameter of about ¼ inch. A pair of angled nostril bores, ⅛ inch in diameter, extend radially from the fourth section to an exterior surface of the body. These nostril bores intersect the exterior surface, spaced about ½ inch apart at the exterior surface. Preferably the first and second sections are about ½ inch deep, the third section is about 1 inch deep, and the fourth section is at least 1½ inch deep.

BRIEF DESCRIPTION OF THE DRAWINGS

FIG. 2 is a top view of the device shown in FIG. 1.

FIG. 3 is a rear end view of the device shown in FIG. 1.

DETAILED DESCRIPTION

Figure 1:
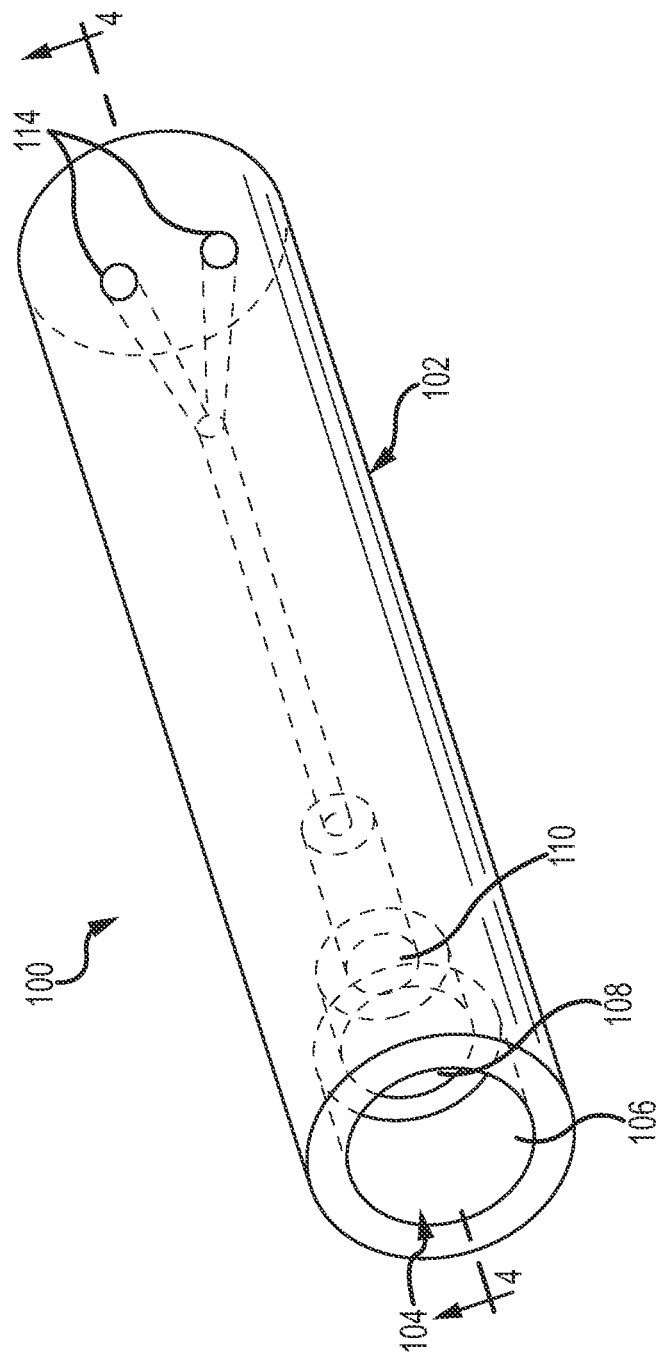
FIG. 1 is an outer perspective view an exemplary embodiment of a game call device in accordance with this disclosure.
Figure 4:
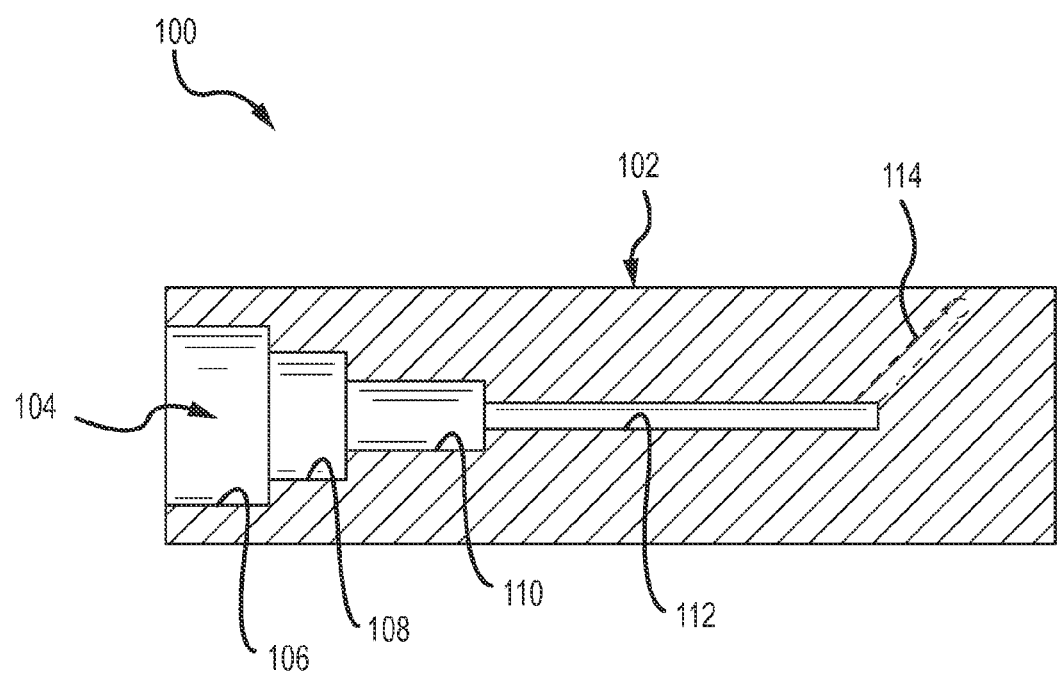
FIG. 4 is a longitudinal cross sectional view of the device shown in FIG. 1 taken along the line 4-4 in FIG. 1.

An exemplary embodiment of the game call device in accordance with the present disclosure is shown in a perspective view in FIG. 1. The device 100 is a solid cylindrical body 102 that is preferably made from a 5/4 hardwood dowel, i.e., having an outer diameter of about 1.25 inches, and a length about 4 inches long. The body 102 has a central axial stepped blind bore 104. The blind bore 104 has a first section 106 having a 1 inch diameter extending 0.5 inch from the open end of the body 102. This first section 106 joins a second section 108 having a ¾ inch diameter extending axially another ½ inch. This second section 108 joins a third section 110 having a ½ inch diameter extending axially another 1 inch into the body 102. This third section 110 joins a fourth section 112 having a ¼ inch diameter which extends 1½ inch further into the body 102 for a total depth, or axial bore length, of 3½ inch. Two ⅛ inch diameter radial angled bores or holes 114, spaced circumferentially ½ inch apart, are drilled at a 45 degree angle ½ inch from the distal end 116 of the body 102 into the central bore 104 so as to intersect with the ¼ inch diameter section 112 of the bore 104.

The combination of bore sections 106, 108, 110, 112 and angled radial holes 114 generally represent the internal cavities of a baby alligator's head with the holes 114 corresponding to the alligator's nostrils. Since a baby alligator issues its call through its nostrils without opening its mouth, the shape and size of the holes 114 are important in shaping the sound that the device 100 can produce.

To use the call device, a user places his or her lips into the first section 106 of the blind bore 104 and speaks a syllable, for example, the syllable "MER". The user's vocal chords produces the vibrations and the resulting sound generated through the nostril holes 114 sounds remarkably close to that of a baby alligator calling for its mother.

While the preferred embodiment just described is preferably made of a hardwood 5/4 dowel such as oak, hickory, cherry or maple, any solid body can be utilized such as a hard rubber or plastic material that can be drilled or molded in the shape as above described.

The invention claimed is:

1. A game call device comprising:
   a solid cylindrical body having about a 5/4 inch outer diameter and having an exterior surface, the body having a central axial blind bore therein extending from a proximal end to a closed distal end of the blind bore, the blind bore having stepped, concentric, progressively smaller diameter sections from the proximal end toward the closed distal end of the blind bore of the body, wherein a first section is ½ inch deep, a second section is ½ inch deep, a third section is 1 inch deep and a fourth section is 1½ inch deep; and
   a pair of angled nostril bores extending from a distal end of the fourth section to an exterior surface of the body, wherein the nostril bores intersecting the exterior surface are spaced ½ inch apart.

2. The game call device according to claim 1 wherein the first section has a diameter of 1 inch.

3. The game call device according to claim 2 wherein the second section has a diameter of ¾ inch.

4. The game call device according to claim 3 wherein the third section has a diameter of ½ inch.

5. The game call device according to claim 4 wherein the fourth section has a diameter of ¼ inch.

6. The game call device according to claim 1 wherein the nostril bores are radially angled about 45 degrees from the central axis of the cylindrical body and have a ⅛ inch diameter.

7. The game call device according to claim 6 wherein the nostril bores intersect the exterior surface ½ inch from the distal end of the body.

8. The game call device according to claim 7 wherein the thickness between the distal end of the fourth section and a distal end of the body is about ½ inch thick.

9. A game call device comprising:
- a solid cylindrical body having an exterior surface, the body having a central axial blind bore therein extending at least about 3½ inches axially from a proximal end toward a closed distal end of the blind bore in the body, the blind bore having stepped, concentric, progressively smaller diameter sections from the proximal end toward the closed distal end of the blind bore in the body, wherein a first section has a diameter of about 1 inch, a second section has a diameter of about ¾ inch, a third section has a diameter of about ½ inch and a fourth section is 1½ inch deep; and
- a pair of angled ⅛ inch diameter nostril bores extending from a distal end of the fourth section to an exterior surface of the body, wherein the nostril bores intersecting the exterior surface are spaced ½ inch apart.

10. The device according to claim 9 wherein the first section is ½ inch deep.

11. The device according to claim 9 wherein the first and second sections are ½ inch deep.

12. The device according to claim 9 wherein the third section is about 1 inch deep.

13. The device according to claim 9 wherein the fourth section has a diameter of about ¼ inch.

14. The device according to claim 9 wherein the first and second sections are each about ½ inch deep, the third section is about 1 inch deep, and the $4^{th}$ section is at least about 1½ inch deep.

15. The device according to claim 14 wherein the outer diameter of the body is about 1¼ inches.

16. A game call device comprising:
- a solid cylindrical body having an exterior surface and an outer diameter of about 1¼ inch, the body having a central axial blind bore having a closed end therein extending at least about 3½ inches axially from a proximal end toward a distal end of the body, the blind bore having stepped, concentric, progressively smaller diameter sections from the proximal end toward the distal end of the body, wherein a first section has a diameter of about 1 inch, a second section has a diameter of about ¾ inch, a third section has a diameter of about ½ inch and a fourth section is 1½ inch deep; and
- a pair of angled nostril bores extending from a distal end of the fourth section to an exterior surface of the body, wherein the nostril bores intersecting the exterior surface are spaced ½ inch apart.

17. The device according to claim 16 wherein the first section is ½ inch deep.

18. The device according to claim 16 wherein the first and second sections are ½ inch deep.

19. The device according to claim 18 wherein the third section is about 1 inch deep.

20. The device according to claim 19 wherein the fourth section has a diameter of about ¼ inch.

* * * * *